US011760346B2

(12) United States Patent
Hanna

(10) Patent No.: US 11,760,346 B2
(45) Date of Patent: *Sep. 19, 2023

(54) SYSTEMS AND METHODS FOR COLLISION AVOIDANCE

(71) Applicant: Knapp Investment Company Limited, Road Town (VG)

(72) Inventor: Keith Hanna, Bronxville, NY (US)

(73) Assignee: Knapp Investment Company Limited

(*) Notice: Subject to any disclaimer, the term of this patent is extended or adjusted under 35 U.S.C. 154(b) by 0 days.

This patent is subject to a terminal disclaimer.

(21) Appl. No.: 17/698,706

(22) Filed: Mar. 18, 2022

(65) Prior Publication Data

US 2022/0203975 A1 Jun. 30, 2022

Related U.S. Application Data

(63) Continuation of application No. 16/737,313, filed on Jan. 8, 2020, now Pat. No. 11,305,766, which is a (Continued)

(51) Int. Cl.
*B60W 30/095* (2012.01)
*G08G 1/16* (2006.01)
(Continued)

(52) U.S. Cl.
CPC .... *B60W 30/0956* (2013.01); *B60W 30/0953* (2013.01); *G06V 20/58* (2022.01);
(Continued)

(58) Field of Classification Search
CPC ......... B60W 30/0956; B60W 30/0953; B60W 2554/00; G06V 20/58; G06V 20/597; G06V 40/19; G08G 1/165; G08G 1/166
(Continued)

(56) References Cited

U.S. PATENT DOCUMENTS 8,692,739 B2 * 4/2014 Mathieu .................... B60R 1/00
382/104
9,405,982 B2 * 8/2016 Zhang ..................... G06V 40/18
(Continued)

FOREIGN PATENT DOCUMENTS

DE  10253509 A1 * 6/2004 ............. B60K 35/00
EP  2594431 A2 * 5/2013 ............... B60Q 1/08
(Continued)

OTHER PUBLICATIONS

P.J.F. et al., "Collision Avoidance Radar Able to Differentiate Objects," 1997, vol. 1, Publisher: IEEE.*
(Continued)

*Primary Examiner* — Tuan C To
(74) *Attorney, Agent, or Firm* — Lee & Hayes, P.C.

(57) ABSTRACT

The disclosure is directed to systems and methods for operating or controlling an ADAS mechanism. A first sensor of an ADAS mechanism can determine a potential obstacle to a vehicle, and a position of the potential obstacle relative to the first sensor. A second sensor can determine a gaze angle of a user of the vehicle. An activation engine in communication with the first sensor and the second sensor can determine a proximity of the gaze angle of the user to the determined position of the potential obstacle. The activation engine can control, in response to the determined proximity, an operation of the ADAS mechanism for responding to the potential obstacle.

20 Claims, 9 Drawing Sheets

Related U.S. Application Data continuation-in-part of application No. 16/192,529, filed on Nov. 15, 2018, now Pat. No. 10,858,000, which is a continuation of application No. 15/714,727, filed on Sep. 25, 2017, now Pat. No. 10,137,893.

(60) Provisional application No. 62/400,039, filed on Sep. 26, 2016.

(51) Int. Cl.
  *G06V 20/58* (2022.01)
  *G06V 20/59* (2022.01)
  *G06V 40/19* (2022.01)

(52) U.S. Cl.
  CPC ............ *G06V 20/597* (2022.01); *G06V 40/19* (2022.01); *G08G 1/165* (2013.01); *G08G 1/166* (2013.01); *B60W 2554/00* (2020.02)

(58) Field of Classification Search
  USPC ........................................................ 701/301
  See application file for complete search history.

(56) References Cited

U.S. PATENT DOCUMENTS

| | | | | |
|---|---|---|---|---|
| 9,619,722 | B2* | 4/2017 | Takeda | G06V 40/193 |
| 10,117,577 | B2* | 11/2018 | Mochizuki | G02B 27/0101 |
| 10,137,893 | B2* | 11/2018 | Hanna | G06V 20/597 |
| 10,444,518 | B2* | 10/2019 | Ponomarev | G02B 27/0101 |
| 2003/0039378 | A1* | 2/2003 | Yuasa | G06T 7/74 |
| | | | | 382/104 |
| 2004/0150514 | A1* | 8/2004 | Newman | B60Q 9/008 |
| | | | | 345/7 |
| 2004/0178894 | A1* | 9/2004 | Janssen | G01C 21/365 |
| | | | | 348/148 |
| 2005/0143887 | A1* | 6/2005 | Kinoshita | B60W 10/18 |
| | | | | 382/104 |
| 2007/0279250 | A1* | 12/2007 | Kume | G08G 1/162 |
| | | | | 340/903 |
| 2009/0022368 | A1* | 1/2009 | Matsuoka | G06F 3/013 |
| | | | | 382/103 |
| 2010/0253494 | A1* | 10/2010 | Inoue | G02B 27/01 |
| | | | | 340/436 |
| 2012/0300061 | A1* | 11/2012 | Osman | G06F 1/325 |
| | | | | 340/436 |
| 2012/0314434 | A1* | 12/2012 | Park | F21S 41/698 |
| | | | | 362/465 |
| 2013/0051042 | A1* | 2/2013 | Nordbruch | B60Q 1/085 |
| | | | | 362/466 |
| 2013/0058116 | A1* | 3/2013 | Galbas | B60Q 1/48 |
| | | | | 362/512 |
| 2015/0154461 | A1* | 6/2015 | Kitaura | G06V 20/597 |
| | | | | 348/148 |
| 2015/0210293 | A1* | 7/2015 | Fletcher | B60W 30/0956 |
| | | | | 701/301 |
| 2016/0018889 | A1* | 1/2016 | Skogo | G06F 3/013 |
| | | | | 348/78 |
| 2016/0144785 | A1* | 5/2016 | Shimizu | B60R 11/02 |
| | | | | 340/435 |
| 2016/0280136 | A1* | 9/2016 | Besson | G06V 20/597 |
| 2017/0240098 | A1* | 8/2017 | Sweeney | B60Q 1/381 |

FOREIGN PATENT DOCUMENTS

| | | | | |
|---|---|---|---|---|
| EP | 2666671 | A1 * | 11/2013 | ............ B60Q 1/143 |
| JP | 4342708 | B2 * | 10/2009 | |

OTHER PUBLICATIONS

Zezhong et al., "Obstacle Detection and Road Following using Laser Scanner," 2006, vol. 2, Publisher: IEEE.*
Amir et al., "Vehicle Detection Techniques for Collision Avoidance Systems: A Review," 2015, vol. 16, Publisher: IEEE.*

* cited by examiner

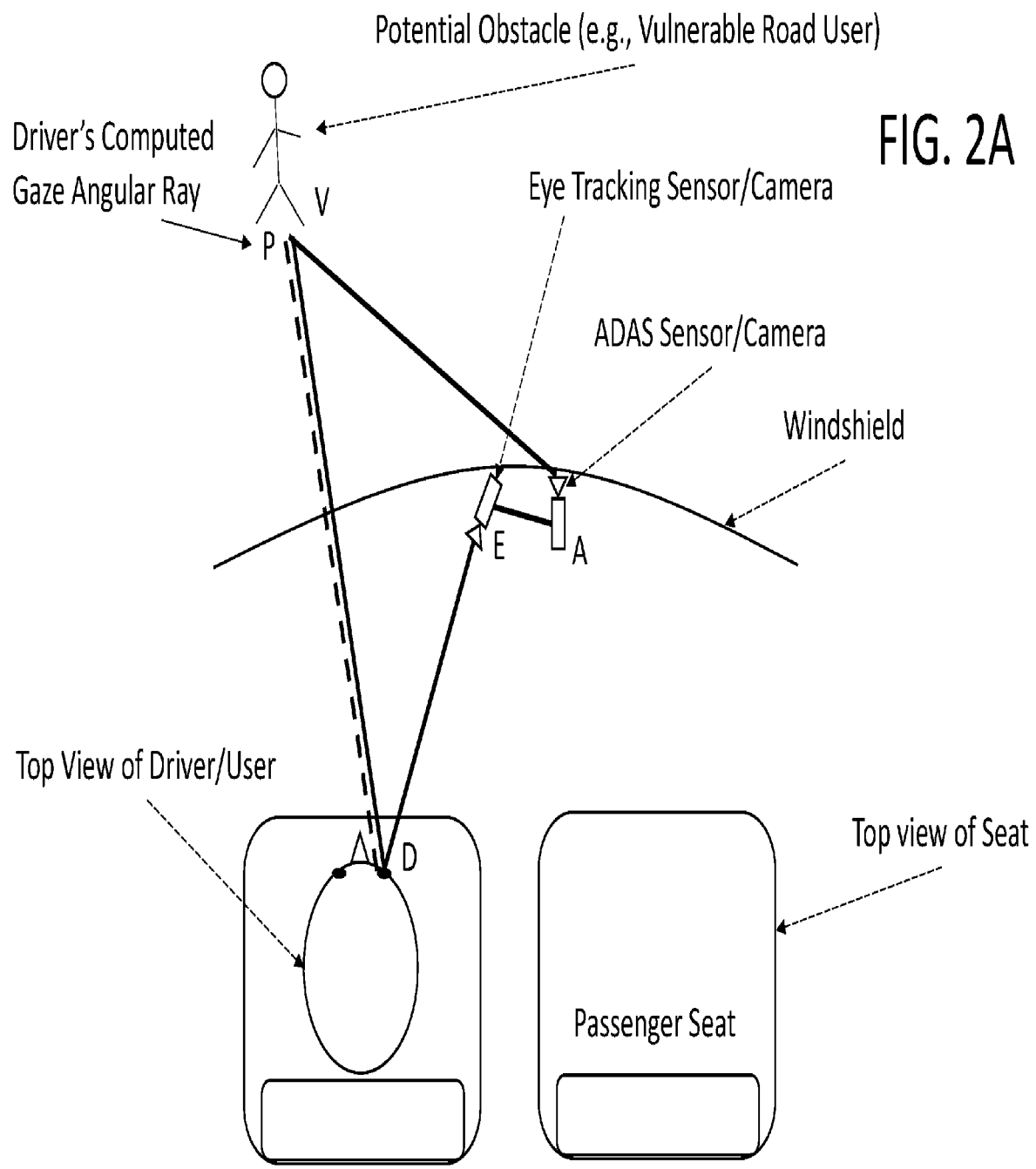

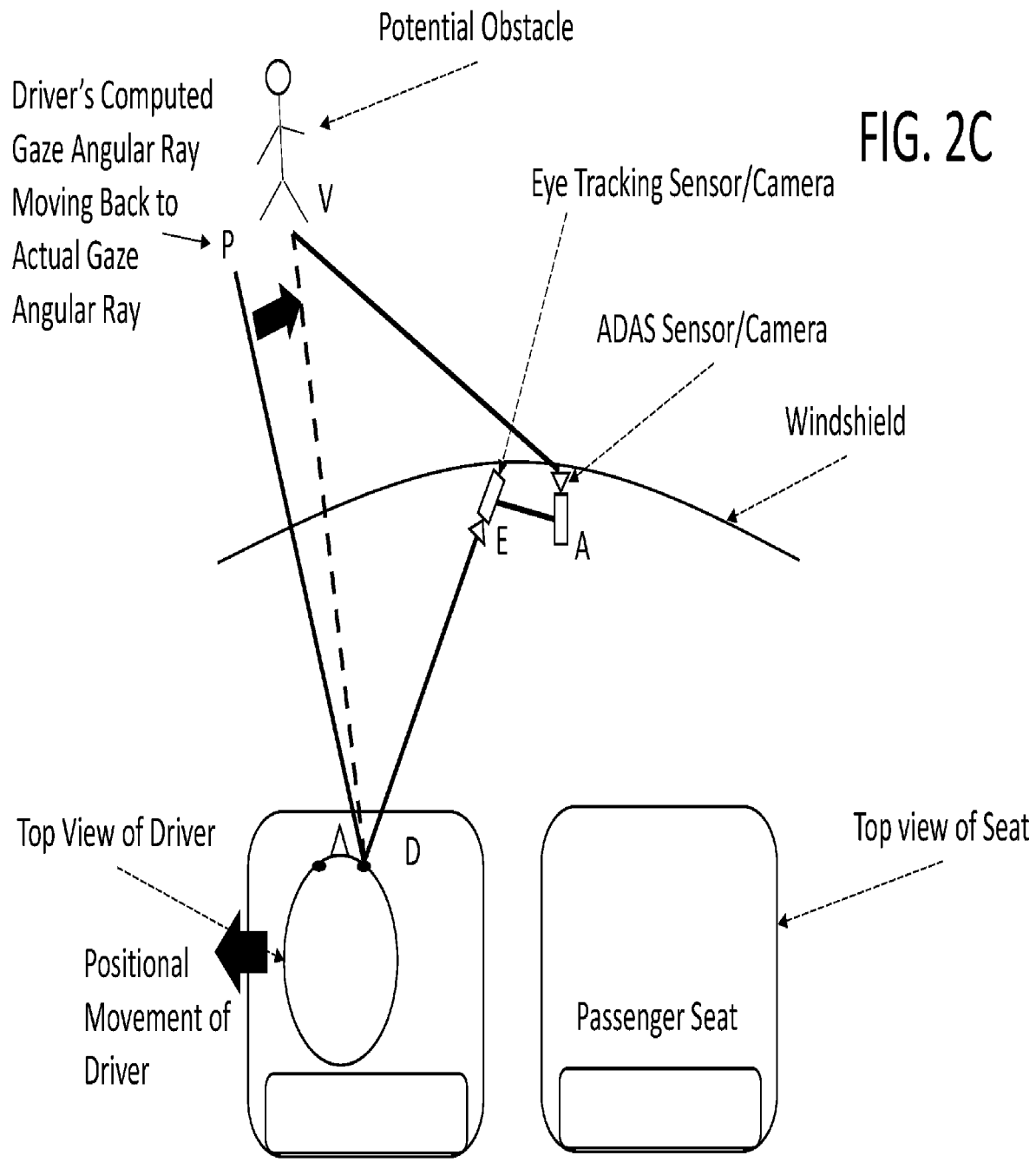

SYSTEMS AND METHODS FOR COLLISION AVOIDANCE

CROSS-REFERENCE TO RELATED PATENT APPLICATION

This application claims priority to and is a continuation of U.S. Ser. No. 11/305,766B2, filed Jan. 8, 2020, titled "COMBINING DRIVER ALERTNESS WITH ADVANCED DRIVER ASSISTANCE SYSTEMS (ADAS)," which in turn claims priority to and is a continuation-in-part of U.S. Ser. No. 10/858,000B2, filed Nov. 15, 2018, titled "COMBINING DRIVER ALERTNESS WITH ADVANCED DRIVER ASSISTANCE SYSTEMS (ADAS)," which in turn claims priority to and is a continuation of U.S. Ser. No. 10/137,893B2, filed Sep. 25, 2017, titled "COMBINING DRIVER ALERTNESS WITH ADVANCED DRIVER ASSISTANCE SYSTEMS (ADAS)," which in turn claims the benefit of and priority to U.S. provisional application No. 62/400,039, filed Sep. 26, 2016, titled "METHOD FOR COMBINING DRIVER ALERTNESS WITH ADVANCE DRIVER ASSISTANCE SYSTEMS (ADAS)," each of which is hereby incorporated by reference herein in their entirety for all purposes.

FIELD OF THE DISCLOSURE

This disclosure generally relates to systems and methods for vehicular related safety, including but not limited to systems and methods for controlling or using a collision avoidance system.

BACKGROUND

Advanced Driver Assistance Systems (ADAS) are becoming commonplace. Such systems use sensors such as cameras and radar mounted on the vehicle to sense and detect potential obstacles such as pedestrians or vehicles. However, there are a number of scenarios in which an ADAS may not be able to adequately or safely determine whether to trigger an action for safety reasons, or not.

SUMMARY

This disclosure is directed to systems and methods for using a user's perceived alertness and/or reaction (or lack thereof) to a potential obstacle, to control or modify how an ADAS mechanism/system may operate. By combining user aspects with the ADAS mechanism/system's evaluation of the potential obstacle, the ADAS mechanism/system can adjust its actions relative to the potential obstacle.

In some aspects, this disclosure is directed a method for operating or controlling an ADAS mechanism/system (hereafter sometimes referred to as an ADAS, or an ADAS system, device or mechanism). A first sensor of an ADAS mechanism can determine a potential obstacle to a vehicle, and a position of the potential obstacle relative to the first sensor. A second sensor can determine a gaze angle of a user of the vehicle. An activation engine in communication with the first sensor and the second sensor can determine a proximity of the gaze angle of the user to the determined position of the potential obstacle. The activation engine can control, in response to the determined proximity, an operation of the ADAS mechanism for responding to the potential obstacle. In some embodiments, controlling the operation of the ADAS mechanism comprises modifying a predetermined operation of the ADAS mechanism for responding to the potential obstacle.

In some embodiments, the activation engine identifies that the determined proximity is at or within a first threshold of a plurality of predefined thresholds. The activation engine can control the operation of the ADAS mechanism according to the determined proximity being at or within which of the plurality of predefined thresholds. The activation engine can determine that the determined proximity of the gaze angle of the user to the determined position at a first time instance is at or within a predefined threshold, and that the user appears to gaze further away from the potential obstacle at a subsequent time instance. The activation engine can increase a threshold for the ADAS mechanism to initiate collision avoidance, and/or may provide an alert to the user regarding the potential obstacle, and/or to the potential obstacle (e.g., road user). The activation engine can determine that the determined proximity of the gaze angle of the user to the determined position is above a predefined threshold. The activation engine can maintain or decrease a threshold for the ADAS mechanism to initiate collision avoidance, and/or may provide an alert to the user and/or to the potential obstacle.

In some embodiments, the activation engine determines that the determined proximity of the gaze angle of the user to the determined position is at or within a predefined threshold, at a first time instance and at a subsequent time instance. The activation engine can increase a threshold for the ADAS mechanism to initiate collision avoidance. The activation engine can determine that the determined proximity of the gaze angle of the user to the determined position is at or within a predefined threshold, and that the user appears to respond to the potential obstacle in a sudden or immediate manner. The activation engine can decrease or maintain a threshold for the ADAS mechanism to initiate collision avoidance, or may provide an alert to the user regarding the potential obstacle, and/or to the potential obstacle.

In certain embodiments, the activation engine determines that the determined proximity of the gaze angle of the user to the determined position is at or within a predefined threshold, and that the user's facial or eye expression corresponds to shock or distress. The activation engine can decrease a threshold for the ADAS mechanism to initiate collision avoidance, and/or may provide an alert to the user regarding the potential obstacle, and/or to the potential obstacle. The activation engine can calibrate the second sensor for determining the gaze angle of the user according to a movement of the user relative to the second sensor. The calibrating can include determining an offset between the gaze angle of the user determined by the second sensor, and a direction or the location of the potential obstacle relative to the second sensor according to the first sensor. In some embodiments, the activation engine compares a rate of change of the gaze angle and a rate of change of an angle of the potential obstacle relative to the first or second sensor. The activation engine may control the operation of the ADAS mechanism for responding to the potential obstacle, according to the comparison, and/or may provide an alert to the user regarding the potential obstacle, and/or to the potential obstacle.

In some aspects, this disclosure is directed to a system for operating an advanced driver assistance system (ADAS) mechanism. The system can include a first sensor of an ADAS mechanism. The first sensor can be configured to determine a potential obstacle to a vehicle, and a position of the potential obstacle relative to the first sensor. A second sensor can be configured to determine a gaze angle of a user of the vehicle. An activation engine can be in communication with the first sensor and the second sensor. The activation engine can be configured to determine a proximity of the gaze angle of the user to the determined position of the potential obstacle. The activation engine can be configured to control, in response to the determined proximity, an operation of the ADAS mechanism for responding to the potential obstacle. The activation engine can also be configured to control, in response to the determined proximity, an alert to the user regarding the potential obstacle, and/to the potential obstacle.

In some embodiments, the activation engine is configured to identify that the determined proximity is at or within one or more of a plurality of predefined thresholds. The operation of the ADAS mechanism is controlled by the activation engine according to the determined proximity being at or within which of the plurality of predefined thresholds. The activation engine can be configured to determine that the determined proximity of the gaze angle of the user to the determined position at a first time instance is at or within a predefined threshold, and that the user appears to gaze further away from the potential obstacle at a subsequent time instance. The activation engine can be configured to increase a threshold for the ADAS mechanism to initiate collision avoidance, and/or can be configured to provide an alert to the user regarding the potential obstacle, and/or to the potential obstacle. In some embodiments, the activation engine is configured to determine that the determined proximity of the gaze angle of the user to the determined position is above a predefined threshold. The activation engine can be configured to maintain or decrease a threshold for the ADAS mechanism to initiate collision avoidance, and/or can be configured to provide an alert to the user regarding the potential obstacle, and/or to the potential obstacle.

In certain embodiments, the activation engine is configured to determine that the determined proximity of the gaze angle of the user to the determined position is at or within a predefined threshold, at a first time instance and at a subsequent time instance. The activation engine can be configured to increase a threshold for the ADAS mechanism to initiate collision avoidance, and/or can be configured to provide an alert to the user regarding the potential obstacle, and/or to the potential obstacle. In some embodiments, the activation engine is configured to determine that the determined proximity of the gaze angle of the user to the determined position is at or within a predefined threshold, and that the user appears to respond to the potential obstacle in a sudden or immediate manner. The activation engine can be configured to decrease or maintain a threshold for the ADAS mechanism to initiate collision avoidance, and/or can be configured to provide an alert to the user regarding the potential obstacle, and/or to the potential obstacle.

In some embodiments, the activation engine is configured to determine that the determined proximity of the gaze angle of the user to the determined position is at or within a predefined threshold, and that the user's facial or eye expression corresponds to shock or distress. The activation engine can be configured to decrease a threshold for the ADAS mechanism to initiate collision avoidance. The activation engine can be configured to calibrate the second sensor for determining the gaze angle of the user, according to a movement of the user relative to the second sensor. The calibrating may include determining an offset between the gaze angle of the user determined by the second sensor, and a direction or the location of the potential obstacle relative to the second sensor according to the first sensor.

In some aspects, the present disclosure is directed to a method of operating an advanced driver assistance system (ADAS) mechanism. The method can include dynamically updating; by an activation engine, a time period according to at least one variable condition applicable to a vehicle. The method can include determining, by a first sensor of an ADAS mechanism, a first position of a potential obstacle to the vehicle, relative to the first sensor at a first time instance during the dynamically updated time period. The method can include determining, by a second sensor during the dynamically updated time period, gaze angles of a user of the vehicle. In some embodiments, the method includes determining, by the activation engine, that a proximity of a first gaze angle of the gaze angles, to the first position; is within a defined range. The method can include: in response to the determined proximity being within the defined range, performing, by the activation engine; an ADAS action corresponding to the defined range.

In some embodiments, the at least one variable condition applicable to the vehicle includes at least one of: a speed of the vehicle or the potential obstacle, a proximity of the potential obstacle to the vehicle, a trajectory of the vehicle or the potential obstacle, or a probability of the ADAS mechanism in detecting the potential obstacle. In certain embodiments, the method comprises dynamically reducing, by the activation engine, the time period as speed of vehicle or the potential obstacle increases. The method can include dynamically reducing, by the activation engine, the time period as the potential obstacle's distance from the vehicle decreases. The method can include dynamically increasing, by the activation engine, the time period as probability of the ADAS mechanism detecting the potential obstacle decreases. The method can include storing, by the in memory, information about at least one of: the first position of the potential obstacle, the determined gazed angles, gaze directions of the user, or proximity values of the gazed angles relative to the first position, corresponding to the dynamically updated time period.

In certain embodiments, the method includes determining, by the first sensor, a second position of a second potential obstacle to the vehicle, relative to the first sensor, during the dynamically updated time period or another dynamically updated time period. The method can include determining, by the second sensor during the dynamically updated time period or the another dynamically updated time period, second gaze angles of the user of the vehicle. The method can include determining, by the activation engine, that a second proximity of a first gaze angle of the second gaze angles, to the second position, is within the defined range.

In some embodiments, the method includes: in response to the determined second proximity being within the defined range, performing, by the activation engine, the ADAS action corresponding to the defined range. In some embodiments, the activation engine performs the ADAS action corresponding to the defined range, by performing at least one of: controlling an operation of the ADAS mechanism for responding to the potential obstacle, or providing an alert to at least one of: the user regarding the potential obstacle, or the potential obstacle. The method can include identifying, by the activation engine, that the determined proximity is at or within a first threshold of a plurality of predefined thresholds, wherein the ADAS action is determined according to the determined proximity being at or within which of the plurality of predefined thresholds.

In certain aspects, this disclosure is directed to a system for operating an advanced driver assistance system (ADAS) mechanism. The system can include an activation engine configured to dynamically update a time period according to at least one variable condition applicable to a vehicle. A first sensor of an ADAS mechanism can be configured to determine a first positions of a potential obstacle to the vehicle, relative to the first sensor at a first time instance during the dynamically updated time period. A second sensor can be configured to determine, during the dynamically updated time period, gaze angles of a user of the vehicle. The activation engine may be configured to determine that a proximity of a first gaze angle of the gaze angles, to the first position, is within a defined range. The activation engine may be configured to, in response to the determined proximity being within the defined range, perform an ADAS action corresponding to the defined range.

In some embodiments, the at least one variable condition applicable to the vehicle comprises at least one of: a speed of the vehicle or the potential obstacle, a proximity of the potential obstacle to the vehicle, a trajectory of the vehicle or the potential obstacle, or a probability of the ADAS mechanism in detecting the potential obstacle. In certain embodiments, the activation engine is configured to dynamically reduce the time period as speed of vehicle or the potential obstacle increases. The activation engine may be configured to dynamically reduce the time period as the potential obstacle's distance from the vehicle decreases. The activation engine may be configured to dynamically increase the time period as probability of the ADAS mechanism detecting the potential obstacle decreases. In some embodiments, the activation engine is configured to store, in memory, information about at least one of: the first position of the potential obstacle, the determined gazed angles, gaze directions of the user, or proximity values of the gazed angles relative to the first position, corresponding to the dynamically updated time period.

In certain embodiments, the first sensor is further configured to determine a second position of a second potential obstacle to the vehicle, relative to the first sensor, during the dynamically updated time period or another dynamically updated time period. The second sensor may be further configured to determine, during the dynamically updated time period or the another dynamically updated time period, second gaze angles of the user of the vehicle. The activation engine can be further configured to determine that a second proximity of a first gaze angle of the second gaze angles, to the first position, is within the defined range. The activation engine may be further configured to: in response to the determined second proximity being within the defined range, perform the ADAS action corresponding to the defined range.

In some embodiments, the activation engine is further configured to perform the ADAS action corresponding to the defined range, by performing at least one of: controlling an operation of the ADAS mechanism for responding to the potential obstacle, or providing an alert to at least one of: the user regarding the potential obstacle, or the potential obstacle. The activation engine can be further configured to identify that the determined proximity is at or within a first threshold of a plurality of predefined thresholds, wherein the ADAS action is determined according to the determined proximity being at or within which of the plurality of predefined thresholds.

BRIEF DESCRIPTION OF THE DRAWINGS

The skilled artisan would understand that the drawings primarily are for illustration purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 2A is a diagram illustrating one embodiment of a system for operating or controlling an advanced driver assistance system, according to some embodiments;

FIGS. 2B and 2C are diagrams illustrating embodiments of a system for operating or controlling an advanced driver assistance system, according to some embodiments;

DETAILED DESCRIPTION

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

For purposes of reading the description of the various embodiments below, the following descriptions of the sections of the specification and their respective contents may be helpful:

Section A describes a computing environment which may be useful for practicing embodiments described herein; and Section B describes embodiments of systems and methods for operating or controlling an advanced driver assistance system.

A. Computing Environment

Figure 1A:
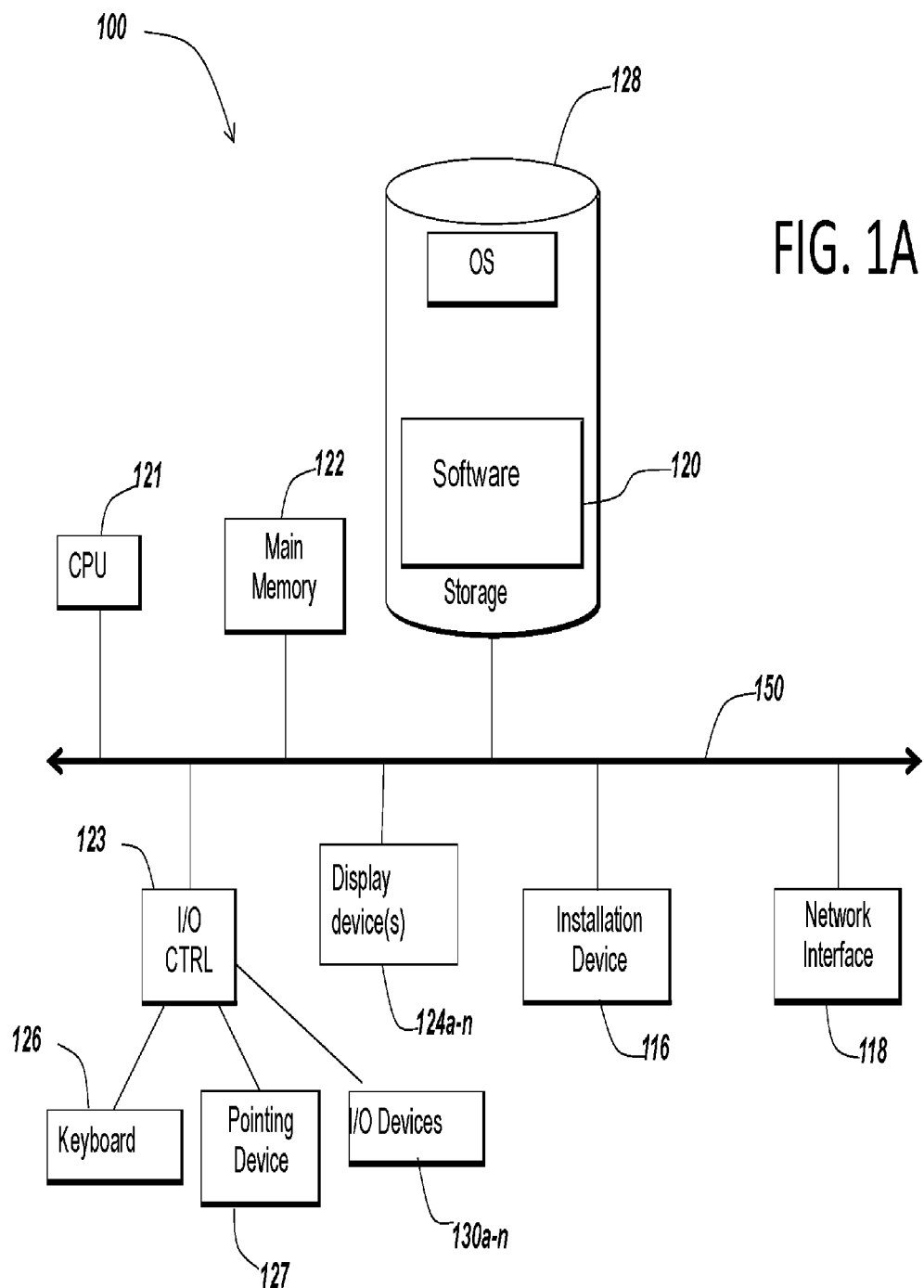
FIGS. 1A and 1B are block diagrams illustrative of embodiments of computing machines for practicing the methods and systems described herein.

Before addressing specific embodiments of the present solution, a description of system components and features suitable for use in the present systems and methods may be helpful. FIG. 1A illustrates one embodiment of a computing environment 101, which can comprise a computing device 100. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, and software 120. The I/O controller 123, in some embodiments, is further connected to a key board 126, and a pointing device 127. Other embodiments may include an I/O controller 123 connected to more than one input/output device 130A-130N.

The computing device 100 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a computing device 100 that displays application output generated by an application remotely executing on a server 106 or other remotely located machine. In these embodiments, the computing device 100 can display the application output in an application window, a browser, or other output window. In one embodiment, the application is a desktop, while in other embodiments the application is an application that generates a desktop. A computing device 100 can, in some embodiments, be referenced by any one of the following terms: client machine(s) 102; client(s); client computer(s); client device(s); client computing device(s); local machine; remote machine; client node(s); endpoint(s); endpoint node(s); server(s), in some embodiments, may be referenced by any one of the following terms: server(s), host computing device(s), or a first machine(s).

Figure 1B:
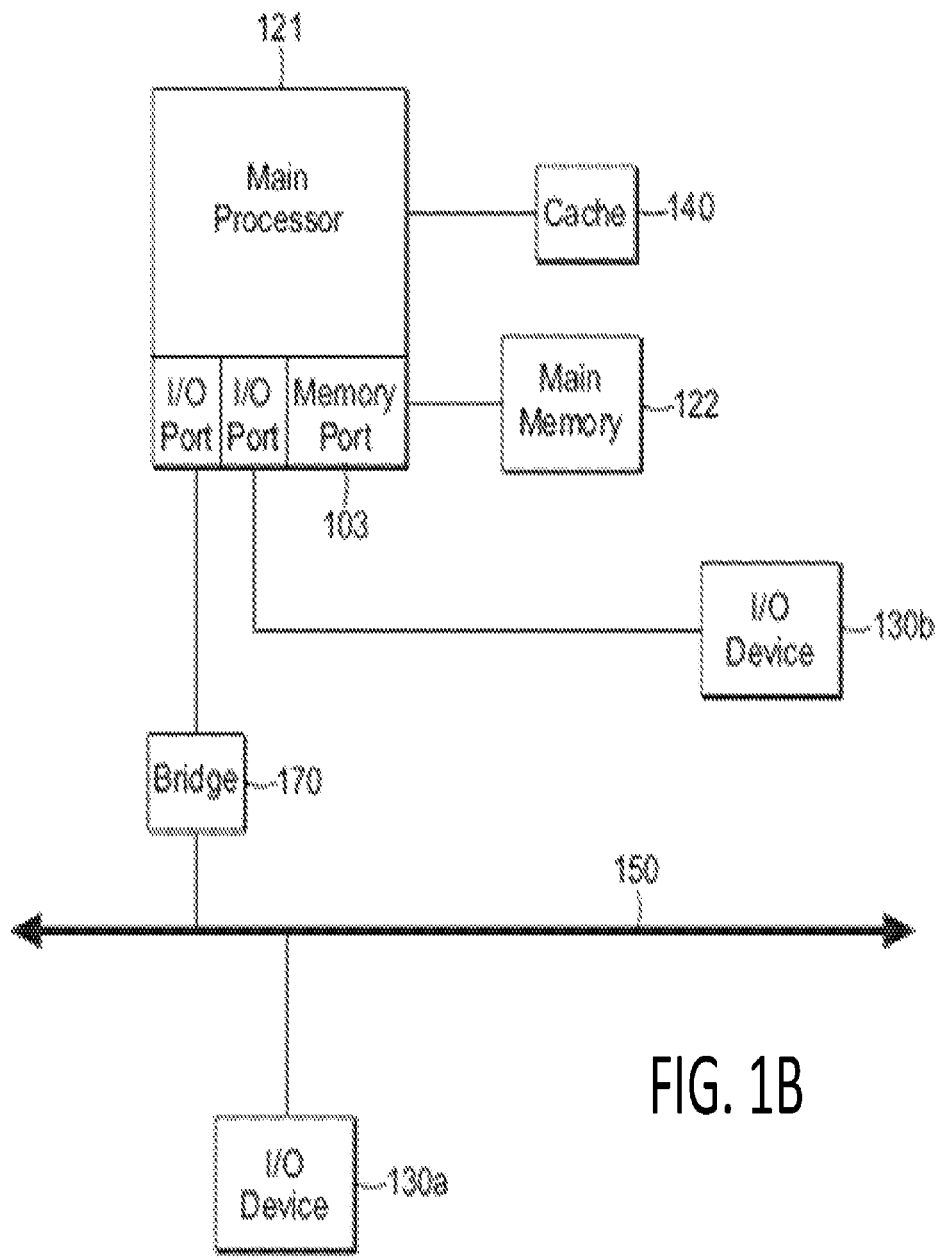

FIG. 1B illustrates one embodiment of a computing device 100. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1B illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121 may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include an image processor, a graphics processor or a graphics processing unit. The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a MicroChannel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or SynchBurst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 121 that can access the main memory 122 via: a system bus 150; a memory port 103; or any other connection, bus or port that allows the processor 121 to access memory 122.

Referring again to FIG. 1A, the computing device 100 can support any suitable installation device 116, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., built and/or designed for) the systems and methods described herein. Optionally, any of the installation devices 116 could also be used as the storage device. Additionally, the operating system and the software can be run from a bootable medium.

The computing device 100 can include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can execute any operating system, while in other embodiments the computing machine 100 can execute any of the following operating systems: versions of the MICROSOFT WINDOWS operating systems; the different releases of the Unix and Linux operating systems; any version of the MAC OS manufactured by Apple Computer; OS/2, manufactured by International Business Machines; Android by Google; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook, a tablet; a device of the IPOD or IPAD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA); any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; an Android phone; or any other handheld mobile device. Having described certain system components and features that may be suitable for use in the present systems and methods, further aspects are addressed below.

B. Operating or Controlling an Advanced Driver Assistance System

FIG. 2A shows a top-view of a driver D sitting in a seat of a vehicle. In one embodiment of the system, a camera "A" (e.g., a first sensor) senses imagery from in front of the vehicle. Within the coordinate system of camera A, a vulnerable user V (e.g., a potential obstacle) can be detected by the ADAS system at a particular range and angle with respect to the ADAS camera. In ADAS systems, there may be uncertainty regarding the determination that an obstacle is a hazard or not. The likelihood or uncertainty can depend on many factors, including the resolution of the sensor, the movement of the obstacle and/or many other factors. This can be an issue particularly when potential obstacles are smaller and when there is less information for ADAS systems to determine its presence with certainty. In one embodiment, the present solution may relate to mitigating this uncertainty.

At substantially the same time, an eye tracking camera E (e.g., a second sensor) mounted in the vehicle facing the driver can detect a gaze angle of the driver D. In one embodiment, the eye tracking system has been pre-calibrated. For example, the driver may be asked to look at known positions around the car (e.g., mirror, top left of windshield) as calibration fiducials. The eye tracking camera may be part of an eye tracking system that can detect and/or monitor the position, orientation and/or movement of an eye by for instance detecting a pupil and/or surrounding region. The eye tracking system can determine a gaze angle of an eye for instance based on the position, angle and/or orientation of the pupil region relative to reference points or fiducials. The ADAS system may incorporate features of existing ADAS systems and/or additional functionalities/capabilities in accordance with the inventive concepts disclosed herein. In FIG. 2A, if the angular ray (P) of the Driver computed by the eye tracker substantially intersects the position V of the potential obstacle (or vulnerable user) recovered by the ADAS system, then it can be inferred that the driver is looking at the potential obstacle. In some embodiments, an assessment of whether the driver is looking at the same object that the ADAS system has detected, is used to modify the automatic actuation control of the ADAS system, as described below, and/or may provide an alert to the user regarding the potential obstacle, and/or to the potential obstacle to warn the potential obstacle (e.g., a road user that may not be aware of the vehicle which may be near or getting closer to the road user).

In some embodiments of the present solution, the user's gaze angle recovered by the eye-tracker and the position V of the potential obstacle recovered by the ADAS system are used to modify the actuation rules of the ADAS system, for example braking, issuance of warning signal, change in illumination, change in vehicle speed, and/or change in vehicle direction, etc. In one embodiment, if the user is gazing at a potential obstacle, then the ADAS system is modified to be less likely to provide positive actuation control of the ADAS system (such as braking). In one embodiment and without limitation to other mathematical formulae, a probability of ADAS actuation may be represented by $$P\_ACTUATION = DIFF/(DIFF+1) \times P\_ADAS\_DETECTION,$$

where DIFF is a measure of the difference (e.g. angular difference in degrees) between the driver's detected eye gaze and the angle of a potential obstacle as recovered by the ADAS system.

For example, if the ADAS system detected a potential obstacle with a particular probability, P_ADAS_DETECTION, and the driver was looking away from the potential obstacle such that DIFF is large, then the probability of actuation P_ACTUATION can be almost equal to the probability of ADAS detection, P_ADAS_DETECTION. In this case, because the driver has not seen the potential obstacle and therefore would not actuate the brakes himself/herself, then it may be safer for the system to actuate the brakes even if there is some limited uncertainty in the ADAS system. In addition or alternatively, the system may provide an alert to the user regarding the potential obstacle so that the user themselves can apply the brakes, and/or provide an alert to the potential obstacle (which can be a road user such as a person or animal) to be aware of the vehicle and can take action to distance itself from the vehicle or otherwise improve safety. On the other hand, for the same value of P_ADAS_DETECTION, if the user is gazing at the potential obstacle such that the angular distance between their gaze direction and the direction of the object provided by the ADAS system is small or close to zero, then from the formula in this particular embodiment, P_ACTUATION would be near to zero. In this case, because the driver has been detected to be looking at the potential obstacle, then it is more likely that the driver himself/herself would apply braking if it was a real potential obstacle, and therefore in the presence of the same uncertainty of the ADAS system, in this case the ADAS system would not apply the brakes automatically, and the system may not provide an alert to the user regarding the potential obstacle. In some embodiments, the system may provide an alert to the potential obstacle (e.g., road user). In some embodiments, the system may highlight or provide more information about the potential obstacle to the user to ensure that the user is more aware of and/or informed about the potential obstacle and can take any appropriate action. For instance, the system may provide the user with an outline of the potential obstacle (e.g., in the presence of fog) as estimated or determined by the system, or an indication of what the system thinks the potential obstacle is (e.g., a person or tree branch).

In some embodiments the present solution provides a means for an ADAS system to interact with a user's vehicle awareness seamlessly, so that a driver can look around a vehicle unengaged one moment, and can look forward at other moments. It has been found that drivers naturally become more engaged in the environment when driving through more complex scenes, even if a vehicle is being driven autonomously. Complex scenes in this context can mean busy streets with vehicles, pedestrians, or many potential obstacles. These may also be the same scenes were ADAS systems have difficulty determining with certainty whether an object is a potential obstacle, due to their complexity. In other scenes where the road is relatively clear, then drivers may tend to become less engaged (due to boredom, for example), and these are also the types of scenes where ADAS systems work with the highest certainty. There are many different types of scene complexities between these two extremes, and in some embodiments, the present solution may provide a seamless way for the user's awareness to assist ADAS actuation seamlessly without a binary switching on or off of an ADAS system.

Figure 2B:
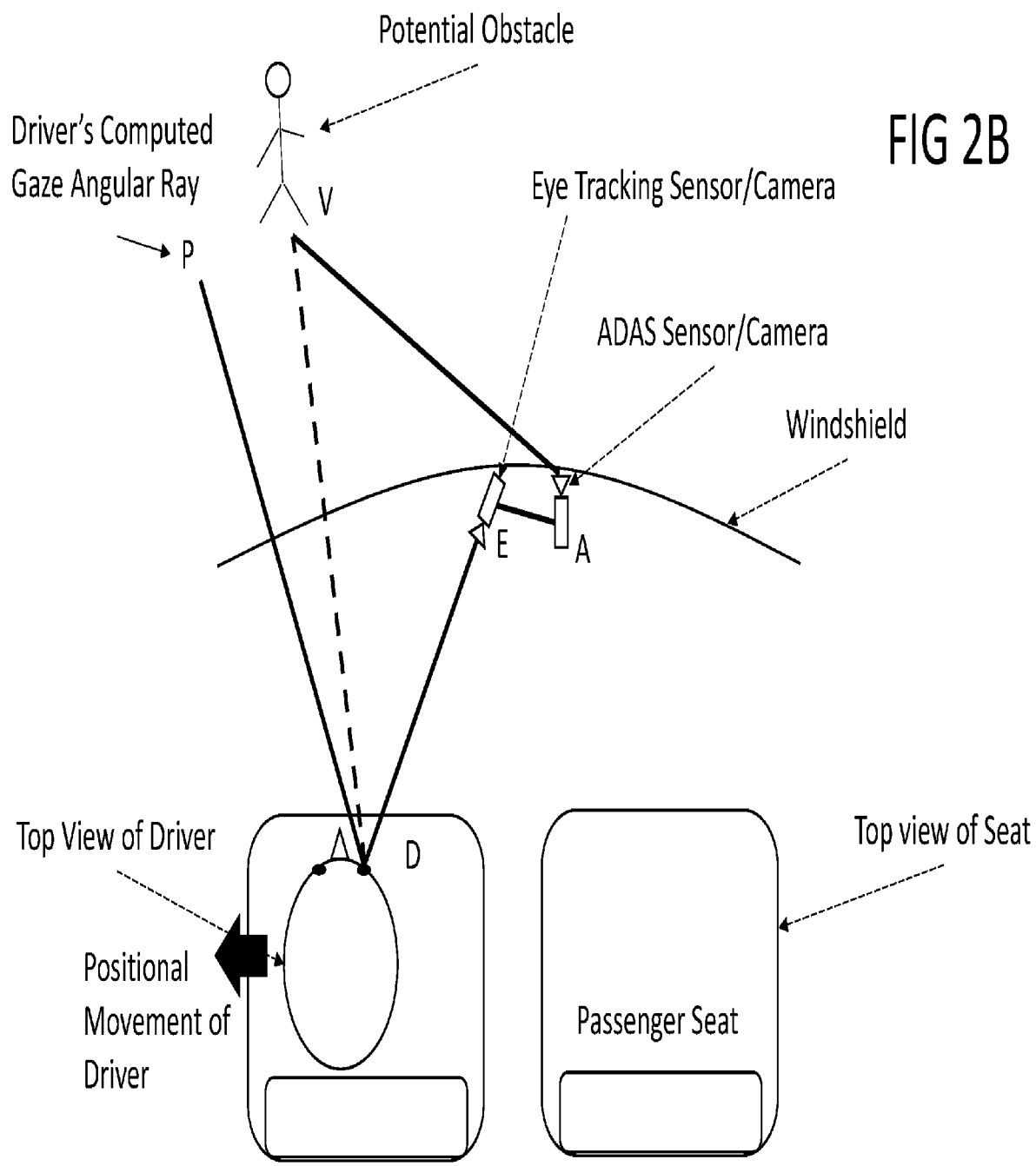

In some embodiments, it may not be possible to have the driver perform a calibration step for the eye-tracker, or even after calibration, the driver may have moved from their position in the seat at the time of calibration. This is indicated in FIG. 2B, where the driver has moved to the left compared to FIG. 2A. In this case, because the eye tracker has gone out of calibration, the computed gaze angle of the driver from the eye-tracker has an offset such that even if the driver was gazing at the potential obstacle, then the eye-tracker may detect that the driver is gazing in a slightly different direction. In one embodiment, the present solution addresses this by a dynamic calibration process. This process operates in parallel with the first mode of operation described earlier in this specification. In one embodiment, the dynamic calibration process determines the probability that a user is looking at an obstacle that the ADAS system has detected, compared to being disengaged. In one non-limiting embodiment, the probability may be computed based on one or more of: the number of potential obstacles that the ADAS system has detected, and the track trajectory of the angular position of the potential obstacle recovered both by the ADAS system and the eyetracker. In one embodiment, for example, if there is only one potential obstacle detected by the ADAS system, and the track trajectory of the angular position of the potential obstacle recovered both by the ADAS system and the eyetracker are similar, then it is likely that the driver's gaze is following the potential obstacle over a time period. As the number of potential obstacles reduces, then there can be less probability of ambiguity in the angular position of the potential obstacle recovered by the ADAS system compared to the angular position recovered by the eye tracker.

In one embodiment, a measure of the trajectory difference between the angle recovered over a time period by the ADAS system and that recovered by the eyetracker may be represented by:

$$TD=|(dE/dt-dA/dt)|,$$

where dE/dt is the rate of change of the angle detected by the eye tracker during the period that an object is detected by the ADAS system, and dA/dt is the rate of change of the angle detected by the ADAS system over the corresponding time period.

A large number for TD can mean that the recovered trajectories have a very different shape and speed (but there may be a potential offset due to the aforementioned miscalibration which is removed in the measure due to use of the differential value), and a small number for TD can mean that the recovered trajectories have a similar shape and speed. In one embodiment, the probability, P_OBSTACLE_GAZE, that a user is gazing at the same object that the ADAS system has detected may be represented as:

$$P\_OBSTACLE\_GAZE=1/(TD+1)\times 1/N,$$

where N is the number of objects detected in the scene by the ADAS system, and where N>=1, since the dynamic calibration in this embodiment is performed when the ADAS system detects at least one potential obstacle. In this formulation, if the number of detected obstacles is only 1, then N=1 and the value of 1/N is 1. If in addition the eyetracker and ADAS gaze trajectories are similar, then TD is approximately 0. In this case P_OBSTACLE_GAZE is approximately 1. This can mean that there is some certainty that the user is looking at the same obstacle that the ADAS system has detected. When the value of P_OBSTACLE_GAZE is close to 1 (or above a threshold), then the offset in the gaze angle between the eyetracker and the ADAS system (Sampled_Offset) can be sampled, and updated in a filter over time. For example, the update rule for may be $$\text{Offset}(t)=K\times\text{Offset}(t-1)+(1-K)\times\text{Sampled\_Offset},$$

where K is a smoothing parameter to prevent large jumps in the offset and may have a value in the range of 0.8 to 0.95, exploiting a constraint that the driver is not moving around randomly on their seat, and remains in approximately the same position for at least short durations of time. In this way, an estimate of the angular offset (Offset(t)) is available at each time instant, and can be used to calibrate the results of the eye tracker dynamically. This is shown in FIG. 2C, where the gaze position of the driver after they have moved in FIG. 2B (compared to FIG. 2A) can be corrected to match the gaze direction recovered by the ADAS system.

Figure 2D:
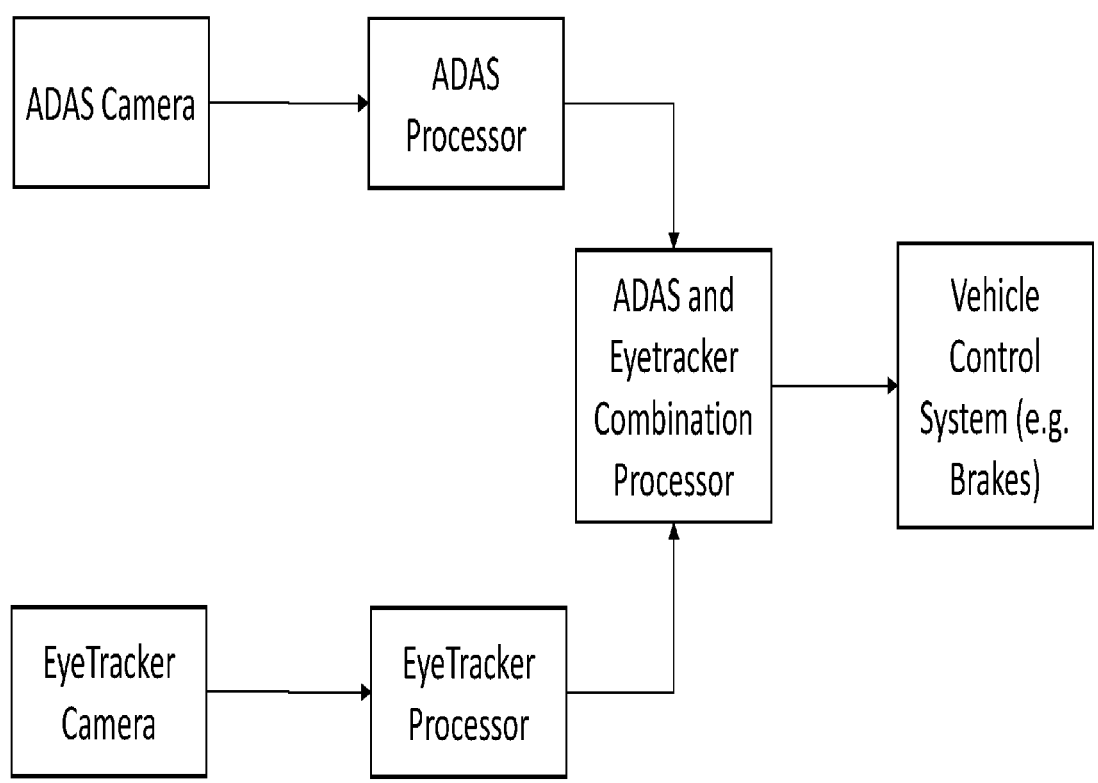
FIG. 2D depicts an illustrative embodiment of a system for operating or controlling an advanced driver assistance system, according to some embodiments.

As the driver slightly shifts his/her position in the seat, then the dynamic calibration process can continue to compute an offset between the ADAS system and the eye tracking system. The embodiment with particular formula above are examples, and other formulae and implementation methods may be used in the invention. FIG. 2D shows an implementation of one embodiment of the present solution.

Figure 2E:
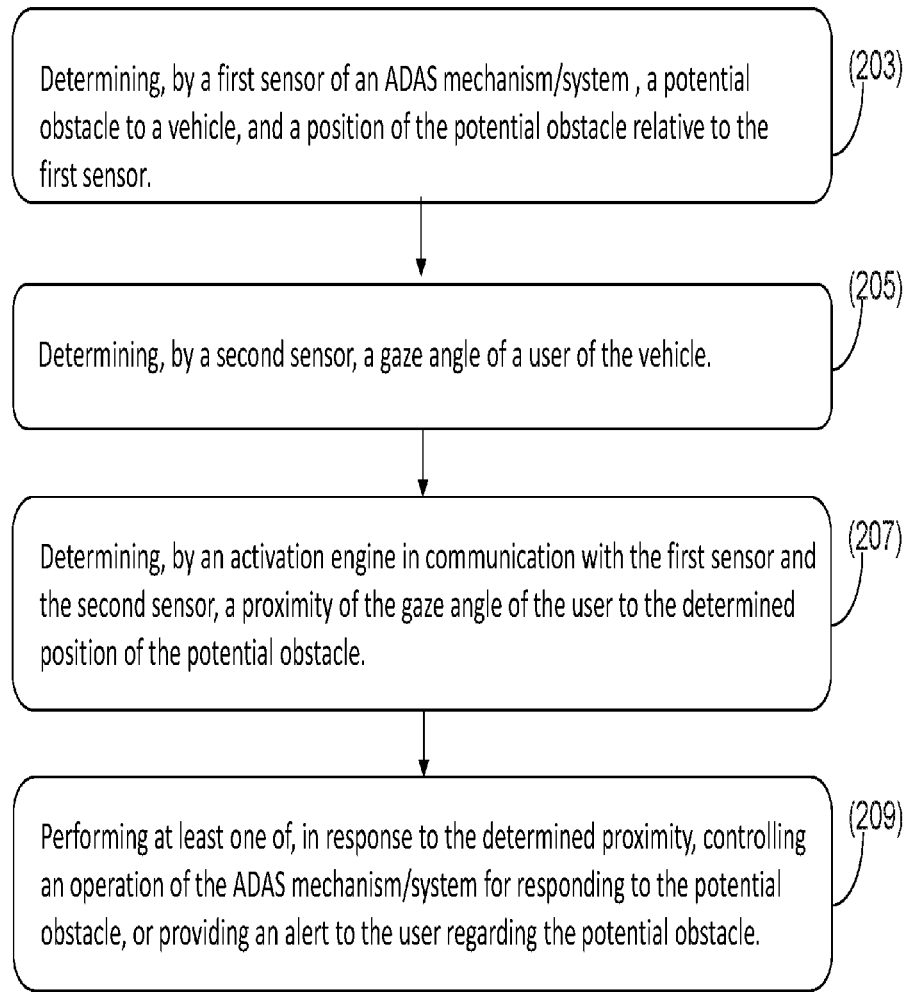
FIG. 2E is a flow diagram illustrating a method for operating or controlling an advanced driver assistance system, according to some embodiments.

Referring now to FIG. 2E, one embodiment of a method for operating or controlling an ADAS is depicted. The method can include determining, by a first sensor of an ADAS mechanism/system, a potential obstacle to a vehicle, and a position of the potential obstacle relative to the first sensor (201). A second sensor can determine a gaze angle of a user of the vehicle (203). An activation engine in communication with the first sensor and the second sensor can determine a proximity of the gaze angle of the user to the determined position of the potential obstacle (205). The activation engine can control, in response to the determined proximity, an operation of the ADAS mechanism/system for responding to the potential obstacle, and/or may provide an alert to at least: the user regarding the potential obstacle, or the potential obstacle.

Referring now to 201, and in some embodiments, a first sensor of an ADAS mechanism/system determines a potential obstacle to a vehicle, and a position of the potential obstacle relative to the first sensor. The vehicle may include or correspond to any type or form of transport for a user, driver, passenger or operator, and may include any transport on land, air, space, sea or other environment, such as a car or automobile/terrestrial vehicle, a water vessel, a submarine, an aircraft, a hovercraft, etc. The first sensor may include a sensing, detecting and/or measurement device, that may be based on one or more of imaging (e.g., computer vision, infra-red, object recognition), LiDAR, radar, audio/ultrasound, sonar, etc. The potential obstacle may include a potential obstacle to the vehicle and/or a user of the vehicle. The potential obstacle may include or refer to a road user such as a person, animal and/or other vehicle. The potential obstacle may include any object, stationary or otherwise, and in some embodiments can include an object smaller than or of height below a certain threshold, and/or partially obscured from the first sensor due to reduced visibility or contrast from fog, smoke, or the like, and/or due to light foliage, low light and/or limited field of view of the first sensor.

The first sensor of the ADAS mechanism/system may detect, sense or determine the potential obstacle as a potential risk to damage, injury or safety of the vehicle, user of the vehicle, and/or to the potential obstacle (e.g., a vulnerable road user). The first sensor can include a depth sensor, or 3-dimensional analyzer for determining a location/position of the potential obstacle, e.g., relative to a reference position of the first sensor, vehicle and/or user. The first sensor can determine an angular position, direction and/or orientation relative to a reference such as a reference axis of the first sensor, vehicle and/or user. For instance, the first sensor can determine an angular position or direction of the potential obstacle relative to the vehicle user's gaze (e.g., corresponding to a particular eye), by using the first sensor's relative position and orientation to the second sensor, and the second sensor's relative position and orientation to the user's eye.

Referring now to 203, and in some embodiments, a second sensor can determine a gaze angle of a user of the vehicle. The second sensor may comprise any type or form of sensor or device described above in connection with the first sensor. The second sensor can determine a gaze angle of the user at the same time or substantially the same time as the determination of the location of the potential obstacle, e.g., so that the gaze angle and location can be registered or compared contemporaneously. The gaze angle is sometimes referred to as a gaze direction or gaze axis, which may correspond to an axis extending from the center of the eye's pupil and perpendicular to the pupil's plane. The gaze angle can refer to a direction or line of sight of the user's gaze (e.g., from a particular eye), and can be accurately determined (e.g., within 0.1 degree, or within 0.01 degree, etc.) relative to one or more reference axes in 2-dimensional or 3-dimensional space. Likewise, the first sensor can accurately determine an angular position or direction of the potential obstacle relative to the user's gaze (e.g., from a particular eye), to a similar or the same extent.

Referring now to 205, and in some embodiments, an activation engine can determine a proximity of the gaze angle of the user to the determined position of the potential obstacle. The activation engine may be in communication with the first sensor and the second sensor. The activation engine may use information, results and/or measurements from the first sensor and/or second sensor to determine or calculate the proximity. The activation engine may for example include a processor and/or use a 3-dimensional field algorithm to determine the proximity. The proximity can be a spatial, Euclidean, angular and/or other type of separation or distance between the gaze angle and the determined location. For instance, the activation engine may determine an angular difference between the gaze angle and the direction of the potential obstacle relative to the corresponding eye (e.g., as calculated or determined by the first sensor). The activation engine may determine if the gaze angle and the direction of the potential obstacle relative to the corresponding eye are aligned and/or intersect. Where these align and/or intersect, the activation engine may determine or assume that the user is gazing or looking at (e.g., actively aware or alerted of) the potential obstacle, at least for a corresponding time instance.

In some embodiments, the first sensor may determine if the gaze angle intersects or coincides with the determined location, which may be considered equivalent to the gaze angle and the direction of the potential obstacle (relative to the corresponding eye) being aligned. The activation engine may determine or calculate how closely or precisely the gaze angle intersects or coincides with the determined location, e.g., determine or calculate the proximity of the gaze angle and the determined location (e.g., in terms of any distance measures or angular units). The level of proximity may be compared against one or more predefined thresholds (e.g., proximity ranges). In some embodiments, the more proximate (or closer) the gaze angle and the determined location are to each other, the more likely the user is actively aware of the potential obstacle (and can take action to avoid, monitor or ignore the potential obstacle). The less proximate (or farther) the gaze angle and the determined location are to each other, it may be more likely that the user is not actively aware of the potential obstacle (and cannot take action to avoid, monitor or ignore the potential obstacle). The activation engine may identify that the determined proximity is at or within a first threshold of a plurality of predefined thresholds, wherein the operation of the ADAS mechanism and/or the user alerting mechanism is controlled according to the determined proximity being at or within which of the plurality of predefined thresholds.

Referring now to 207, and in some embodiments, the activation engine can control, in response to the determined proximity, an operation of the ADAS mechanism for responding to the potential obstacle. Controlling the operation of the ADAS can comprises modifying a predetermined operation of the ADAS mechanism for responding to the potential obstacle. For instance, an operation of the ADAS mechanism may be predetermined for the case when user reaction/alertness to potential obstacles is excluded from consideration. The activation engine can control the operation of the ADAS mechanism by adding actions (and thresholds) for collision avoidance or collision control, deleting certain existing actions for collision avoidance or collision control, and/or adjusting thresholds for any existing actions. The activation engine may leverage on perceived user reaction/alertness to the potential obstacle to supplement the ADAS mechanism's sensor functions and/or improve the decision-making process of the ADAS mechanism. For instance, if the user is perceived or determined to be looking at or aware of the potential obstacle, the ADAS mechanism may be controlled or adjusted to be less aggressive or sensitive to reacting to the potential obstacle (e.g., since the user is more likely to manually adjust the vehicle or override the ADAS mechanism if it were considered by the user to be a true obstacle, by applying a brake, honking at the potential obstacle that is a road user, or operating a steering wheel for instance), or the system may be configured to be less likely to provide an alert to the user regarding the potential obstacle.

The activation engine can control or adjust the operation (e.g., sensitivity or aggressiveness) of the ADAS mechanism according to the proximity (or intersection/alignment) of the gaze angle with the determined location. The activation engine can control or adjust the operation of the ADAS mechanism according to the determined proximity being at or within one or more of the plurality of predefined thresholds.

Relative to each of the thresholds (or within certain ranges of proximity), additional factors may affect the control or adjustment of the operation. For example, the activation engine may determine that the determined proximity of the gaze angle of the user to the determined position at a first time instance is at or within a predefined threshold, and that the user appears to gaze further away from the potential obstacle at a subsequent time instance. The activation engine may determine that the user is likely aware of the potential obstacle and chooses to ignore the potential obstacle as low or zero risk. In response, the activation engine can increase a threshold for the ADAS mechanism to initiate collision avoidance, so that collision avoidance functionality is less likely to be triggered, and/or may increase the threshold for the activation engine to provide an alert to the user regarding the potential obstacle, making the alert less likely to be announced. In some embodiments, the ADAS mechanism implemented in the present solution may include (vehicle user or road user) alerting functionality in the ADAS mechanism's collision avoidance operations. In this case, the system may accordingly adjust respective threshold(s) for triggering or sending alert(s) to the user and/or the road user (potential obstacle).

As another non-limiting example, the activation engine can determine that the determined proximity of the gaze angle of the user to the determined position is above a predefined threshold (e.g., the user may be unaware of or not fully aware of the potential obstacle), and may determine or decide to maintain or decrease a threshold for the ADAS to initiate collision avoidance, and/or may reduce the threshold for the activation engine to provide an alert to the user regarding the potential obstacle (and/or to the potential obstacle), making the alert more likely to be announced. In yet another non-limiting example, the activation engine can determine that the determined proximity of the gaze angle of the user to the determined position is at or within a predefined threshold, at a first time instance and at a subsequent time instance (e.g., over a prolonged period of time extending beyond a predefined threshold duration). The activation engine may determine that the user is likely to be aware of the potential obstacle and/or actively monitoring the potential obstacle (and can respond to the potential obstacle if needed). In response, the activation engine may increase a threshold for the ADAS to initiate collision avoidance, and/or may increase the threshold for the activation engine to provide an alert to the user regarding the potential obstacle (and/or to the potential obstacle), making the alert less likely to be announced.

In some embodiments, the activation engine can determine, based on the determined proximity of the gaze angle of the user to the determined position (e.g., being within one or more thresholds or ranges), that the user is potentially less than being 100% attentive to the potential obstacle. The activation engine may determine or decide to maintain or decrease a threshold for the ADAS to initiate collision avoidance. The activation engine can use results from tracking the gaze of the user, and from the ADAS mechanism's evaluation of the potential obstacle, to keep/decrease the threshold for the ADAS to initiate collision avoidance. The activation engine can also apply a new action and/or threshold. The new action and/or threshold can be used to provide a warning to the driver or road user to get their attention (e.g., in addition to applying brakes, reducing speed, increasing illumination, etc., per the existing/decreased/maintained threshold).

In another non-limiting example, the activation engine can determine that the determined proximity of the gaze angle of the user to the determined position is at or within a predefined threshold, and that the user appears to respond to the potential obstacle in a sudden or immediate manner. The activation engine may determine or infer that the user is attempting to react to a potential risk or is reacting frantically to the potential risk (and may or may not be able to respond or perform collision avoidance in time). In response, the activation engine may decrease or maintain a threshold for the ADAS mechanism to initiate collision avoidance, or may reduce the threshold for the activation engine to provide an alert to warn the road user (potential obstacle) for instance. In still another non-limiting example, the activation engine may determine that the determined proximity of the gaze angle of the user to the determined position is at or within a predefined threshold, and that the user's facial or eye expression corresponds to shock or distress. The activation engine may determine or infer that the user is shocked or distressed by the potential obstacle and may not be able to properly or timely perform collision avoidance. In response, the activation engine may decrease a threshold for the ADAS to initiate collision avoidance, or may reduce the threshold for the activation engine to provide an alert to warn the road user (potential obstacle) for instance. In some embodiments, the activation engine may decrease a threshold to provide an alert to the user. The alert may include advice, guidance or instructions for performing collision avoidance or evasive action, and/or to prepare the vehicle user and/or road user for impending collision or high likelihood of collision.

In some embodiments, the activation engine may calibrate (e.g., dynamically calibrate or recalibrate) the second sensor for determining the gaze angle of the user according to (or responsive to) a movement of the user relative to the second sensor. The calibrating process may include determining an offset between the gaze angle of the user determined by the second sensor, and an angle or the location of the potential obstacle according to the first sensor. The activation engine may compare a rate of change of the gaze angle and a rate of change of an angle of the potential obstacle relative to the first sensor, and may determine if the user and ADAS mechanism are both tracking the same object (e.g., potential obstacle). The activation engine may control the operation of the ADAS for responding to the potential obstacle, according to the comparison, and/or may control the user alerting mechanism regarding the potential obstacle. The user alerting mechanism can include functionality for alerting the user of the vehicle and/or relevant road user(s).

Figure 2F:
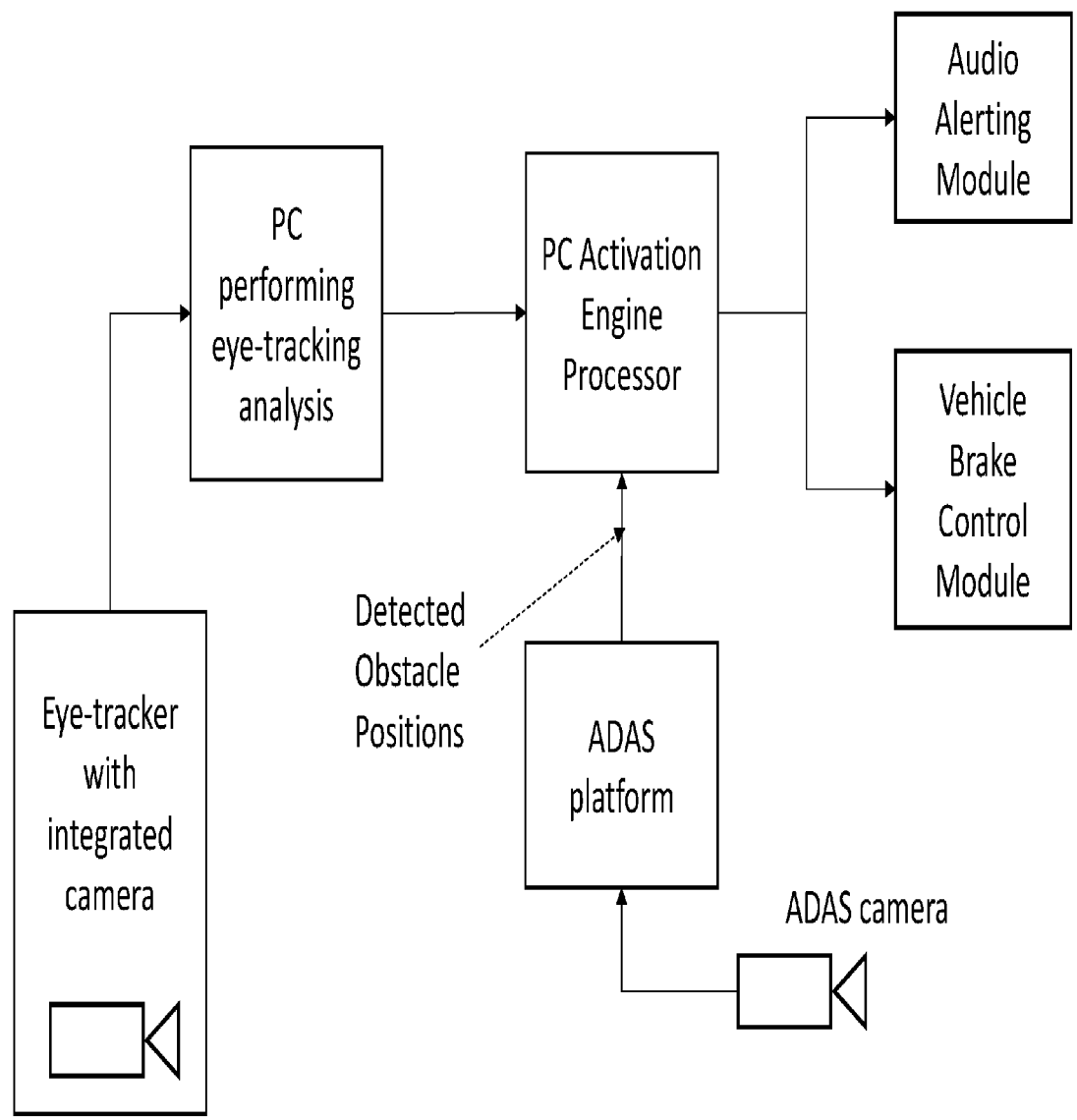
FIG. 2F depicts an example physical implementation of the system, according to some embodiments.

FIG. 2F shows an example implementation of one embodiment of the present solution. The activation engine is shown at the top middle of the figure and in this embodiment is implemented using a PC running software for the activation engine. Detected obstacle positions are fed to a PC Activation Engine from an ADAS platform (e.g., adapted from or based on a Blackberry QNX ADAS processor platform). The sensor for this platform (shown at the bottom right of the figure) in this illustrative implementation may incorporate or use a TIDA-00098 Texas Instruments Aptina Automotive Camera, for instance, adapted in accordance with the inventive concepts disclosed herein. The gaze information from the user may be fed into the PC Activation Engine from a PC performing eye tracking analysis. For instance, and in some embodiments, the PC may execute or incorporate software that includes and/or is adapted from Analysis UX Edition software provided by Gazepoint. The PC's software can use information provided by an eye tracker hardware camera and/or an illumination module, one or both of which may be adapted from or based on Gazepoint GP3 eyetracker system. The PC Activation Engine can be connected to an Audio Alerting module comprising a loudspeaker that alerts the user if they are not gazing in the vicinity of an obstacle detected by the Blackberry QNX ADAS system, for example. The PC Activation Engine can also be connected to the Vehicle's Brake Control Module for automatic control of the vehicle. Although an audio alerting mechanism is discussed, this is merely by way of illustration and not intended to be limiting in any way. For instance, the Alerting Module may use audio, visual, tactile, and/or other feedback modes to perform or provide the alert.

It should be noted that certain passages of this disclosure can reference terms such as "first" and "second" in connection with sensors, directions, locations, etc., for purposes of identifying or differentiating one from another or from others. These terms are not intended to merely relate entities (e.g., a first sensor and a second sensor) temporally or according to a sequence, although in some cases, these entities can include such a relationship. Nor do these terms limit the number of possible entities (e.g., devices) that can operate within a system or environment.

It should be understood that the systems described above can provide multiple ones of any or each of those components and these components can be provided on either a standalone machine or, in some embodiments, on multiple machines in a distributed system. In addition, the systems and methods described above can be provided as one or more computer-readable programs or executable instructions embodied on or in one or more articles of manufacture. The article of manufacture can be a floppy disk, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

While the foregoing written description of the methods and systems enables one of ordinary skill to make and use various embodiments of these methods and systems, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

One of the challenges in some of the aforementioned embodiments can arise because a driver may only gaze upon a single object (potential obstacle) in the scene at one time, while an ADAS system can be capable of detecting multiple objects (e.g., computing probabilities of detection of objects) across the scene simultaneously. For example, at least two objects or potential obstacles may be located a distance sufficiently apart such that the driver cannot gaze upon both at the same time instance. For instance, two sets of pedestrians may be walking on either side of the road ahead of the vehicle and the driver. The ADAS system may incorporate one or more sensors with an effective or combined field of view that is sufficiently wide to detect or register the two sets of pedestrians. If both sets of pedestrians are detected by the ADAS system, each with limited probability, and utilizes or relies on one of the aforementioned embodiments to use the driver's gaze to provide resolution or confirmation, then it may be unrealistic to require the driver to gaze at both sets of pedestrians at once (e.g., to align with the ADAS system's concurrent detection of both sets of pedestrians).

This problem can be addressed by building or establishing a temporal map of the driver's gaze directions, and reconciling the temporal map (or the corresponding gaze directions) with the results of ADAS detection at any time instant based on attributes including the speed (e.g., absolute or relative speed) of the vehicle and/or the object, the proximity of the object or its path, to the vehicle or the vehicle's path, a trajectory of the vehicle or the object, and/or a probability of the ADAS system in detecting the object as an obstacle to the vehicle. In some embodiments, the temporal map for the driver's gaze can include or use a memory buffer that stores, tracks or temporally records at least the gaze directions of the driver at various time instances over a maximum time period.

The maximum time period may be determined, computed or updated (e.g., dynamically, periodically, or otherwise) by, for example, calculating the time expected for the vehicle to pass a point at or near a horizon in a field of view of a camera or sensor(s) of the vehicle's ADAS system for instance. At any point in time, objects a distance behind (or not effectively within a field of view of) the vehicle may not be visible to either the driver or the sensors of most ADAS systems. Therefore, the maximum time period may indicate a time period during which an object may potentially be within a field of view of the driver and the ADAS system. For example, the object can be in a gaze of the driver and within a field of view of the ADAS system for detection by the ADAS system, either at the same time instance or at different time instances within that time period. Such a time period may be defined by or depend on factor(s) discussed above, such as the speed of the vehicle.

Also, the results of the ADAS system, which may for instance include positions or locations of potential obstacle(s), gaze direction/angles, proximity measures (e.g., between gaze direction(s)/angle(s) and location(s) of potential obstacle(s)), and/or information related to probability of detection, can be stored in the temporal map for the ADAS system. In some embodiments, the ADAS system may identify or report one or more potential obstacles with a probability of detection at a first time instance (e.g., the current time instant). The aforementioned proximity measurement process can be performed for the detected ADAS results at the first/current time instant, and for the gaze direction(s) of the driver over a select time period in the gaze direction temporal map. The select time period may correspond to the maximum time period and may include the current/first time instance, and/or may extend (e.g., backwards and/or forward in time) from the current/first time instance, in one or more embodiments.

If proximity of gaze of the driver and ADAS detection (e.g., of a position of an object or potential obstacle), as defined in the aforementioned embodiments (e.g., proximity of the gaze angle of the driver/user to a position of the object as determined by the ADAS system), is detected (e.g., determined to be within a predefined range) for any of the gaze directions in the select time period, then proximity of gaze direction of the driver and ADAS detection can be declared to be detected at the current/first time instant (e.g., to initiate an ADAS action corresponding to the predefined range). Conversely, if proximity of gaze of the driver and ADAS detection, as defined in the aforementioned embodiments, is not detected for any of the gaze directions in the select time period, then proximity of gaze direction of the driver and ADAS detection is declared not to be detected at the current/first time instant. In this way, the fact that the driver has gazed at a potential object at a previous/different time instant (that is not the current/first time instance) can also used to determine the outcome of the aforementioned proximity processing at the current/first time instant. This means that multiple potential obstacles can be distributed across a scene and the driver can gaze at each of them separately over time (prior to, concurrent with, and/or after the current/first time instance) to be considered in the proximity processing.

In certain embodiments, proximity of gaze of the driver and ADAS detection, as defined in the aforementioned embodiments, is determined for a gaze direction and an ADAS detection (of the object's position) both occurring at a same time instance within the select time period. Multiple pairs of gaze direction and corresponding ADAS detection (each pair corresponding to a same respective time instance)

may be checked for proximity of gaze of the driver and the ADAS detected position of the object. In such embodiments, if proximity is detected (e.g., determined to be within a predefined range) for any one of the pairs, then proximity of gaze direction of the driver and ADAS detection can be declared to be detected within the select time period. The activation engine can indicate or otherwise declare this detection at a time instance at the end of (or after, or during) the select time period. Conversely, if proximity of gaze of the driver and ADAS detection, as defined in the aforementioned embodiments, is not detected for any pair of gaze direction and ADAS detection in the select time period, then proximity of gaze direction of the driver and ADAS detection is declared not to be detected in the select time period. The activation engine can declare or otherwise indicate this at a time instance at the end of (or after) the select time period. In this way, the driver's gaze over different time instances within the select time period can be tracked and used to determine the outcome of the aforementioned proximity processing. This means that multiple potential obstacles can be distributed across a scene and the driver can gaze at each of them separately over time within the select time period, and these separate gazes can be considered for proximity processing with respect to ADAS detection of the positions of the potential obstacles.

In some embodiments, the select time period in one or more of the aforementioned implementations may be computed dynamically by the activation engine (or a component thereof), and may depend on multiple factors or variable conditions discussed above, including for instance the speed of the vehicle and probability of detection computed by the ADAS system. The activation engine may determine, update or establish the select time period as a function of one or more of the factors or variable conditions discussed above. For example, as the vehicle's speed increases, then typically the shorter the time period shall be before potential impact with an object or obstacle. A critical time period (or maximum time period) may therefore be computed to be reduced as the speed of the vehicle increases. In some embodiments, and without limitation to other mathematical representations, an illustrative expression of the critical time period may be represented as:

$$Cv = Kc/(Bc+Vc)*(Bc+Vc)$$

where Cv is the critical time period (e.g., in seconds), Vc is the vehicle speed (e.g., in miles per hour), Bc is a baseline speed of the vehicle (e.g., at miles per hour) which can control values of the critical time period to within a reasonable or realistic range for typical vehicle speeds, and Kc is a scale factor. In one embodiment, if Kc is 10000, and Bc is 30 miles per hour, then for a given vehicle speed Vc on the left column of table 1 below, the critical time period Cv is shown on the right column of the table.

TABLE 1

Critical time period in relation to Vehicle Speed.

| Vehicle Speed (Vc) | Critical Time Period (Cv) |
|---|---|
| 0 | 11.11 |
| 10 | 6.25 |
| 20 | 4.00 |
| 30 | 2.78 |
| 40 | 2.04 |
| 50 | 1.56 |
| 60 | 1.23 |
| 70 | 1.00 |

The critical time period may depend on the probability of detection computed by the ADAS system. For example, if the ADAS system determines that the object has anything other than a low probability of being an obstacle in the future (e.g., an unknown or high probability) based on, for example the object's computed spatial trajectory compared to the vehicle's path, then the select time period may be reduced so that the driver has to gaze at the object at a more recent time instance (or more often) to resolve the uncertainty in the ADAS system. In some embodiments, and without limitation to other mathematical representations, an illustrative expression of the critical time period using this method may be:

$$Cpd = Kpd*(P\_OFFSET + P\_ADAS\_DETECTION\_MIN)$$

where P_OFFSET is an offset probability of ADAS detection (e.g., an offset for controlling values of the critical time period to within a reasonable range for various possible values of P_ADAS_DETECTION_MIN), and P_ADAS_DETECTION_MIN is the minimum probability of object detection computed by the ADAS system at the current time instant over all potential obstacles. In one embodiment, when Kpd is 5 and P_OFFSET is 0.1, then table 2 below on the left shows the computed critical time period for each given minimum probability of ADAS detection, P_ADAS_DETECTION_MIN.

TABLE 2

Critical time period in relation to minimum probability of ADAS detection.

| P_ADAS_DETECTION_MIN | Critical Time Period (Cpd) |
|---|---|
| 0.3 | 2.00 |
| 0.4 | 2.50 |
| 0.5 | 3.00 |
| 0.6 | 3.50 |
| 0.7 | 4.00 |
| 0.8 | 4.50 |
| 0.9 | 5.00 |

In some embodiments, critical (or maximum) time periods computed by different (e.g., two or more) methods may be combined resulting in a final critical time period. For example, in one embodiment and without limitation to other mathematical representations, the final critical time period may be the minimum (e.g., overlapping or shared portion) of the critical time periods computed by different methods.

Figure 2G:
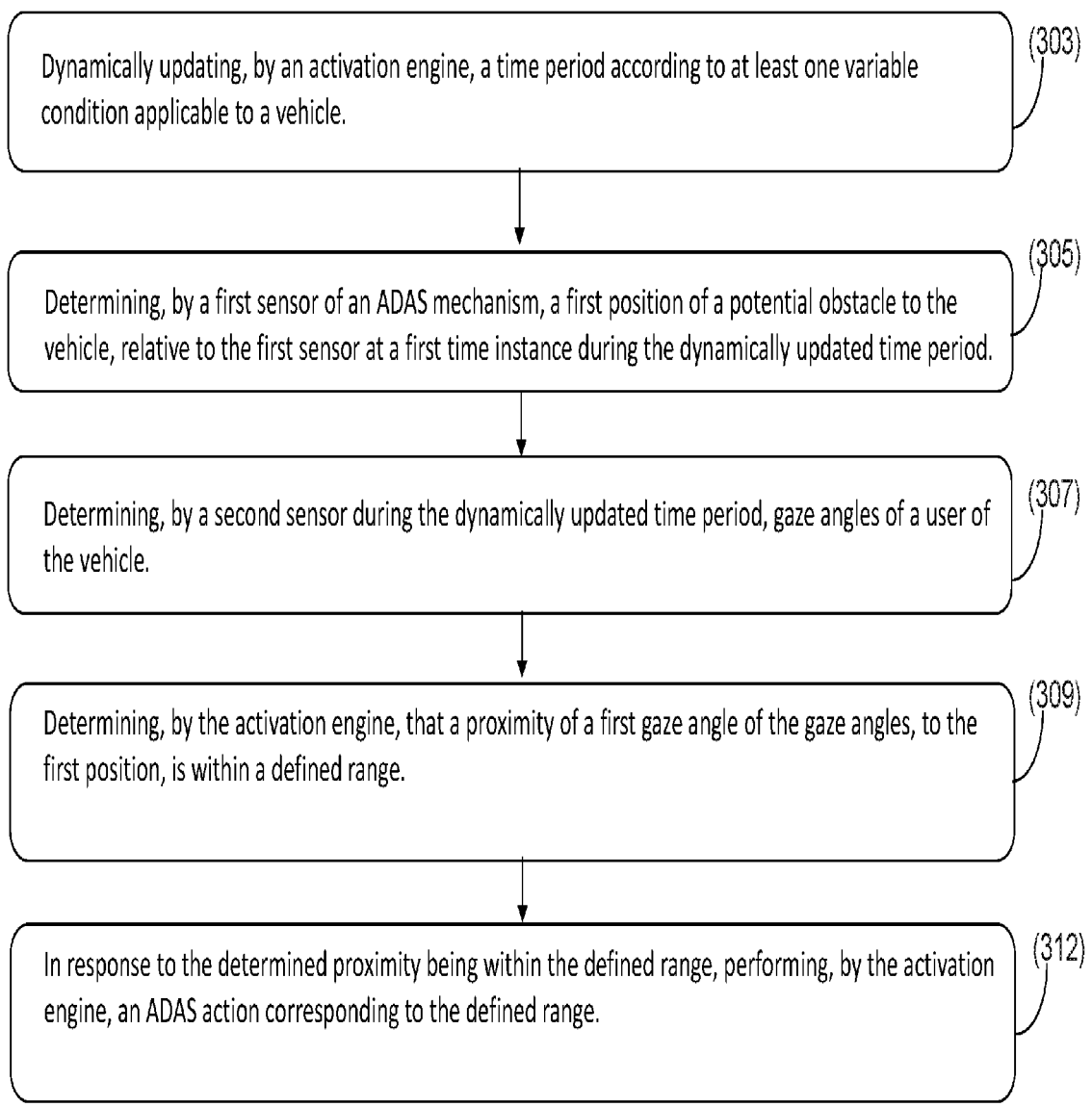
FIG. 2G is a flow diagram illustrating a method for operating or controlling an advanced driver assistance system, according to some embodiments.

Referring now to FIG. 2G, depicted is a flow diagram illustrating a method for operating or controlling an advanced driver assistance system, according to some embodiments. In brief overview, the method can include dynamically updating, by an activation engine, a time period according to at least one variable condition applicable to a vehicle (303). The method can include determining, by a first sensor of an ADAS mechanism, a first position of a potential obstacle to the vehicle, relative to the first sensor at a first time instance during the dynamically updated time period (305). The method can include determining, by a second sensor during the dynamically updated time period, gaze angles of a user of the vehicle (307). The method can include determining, by the activation engine, that a proximity of a first gaze angle of the gaze angles, to the first position, is within a defined range (309). The method can include: in response to the determined proximity being within the defined range, performing, by the activation engine, an ADAS action corresponding to the defined range (312).

Referring again to (303), and in some embodiments, an activation engine can dynamically update a time period according to at least one variable condition applicable to a vehicle. The activation engine can dynamically determine, calculate, estimate and/or update a time period according to at least one variable condition applicable to the vehicle. The activation engine can determine, calculate, estimate and/or update the time period (sometimes referred to as maximum time period, select time period, or critical time period), for instance dynamically in response to a variable condition that has changed (e.g., a change in the vehicle's speed and/or trajectory, beyond a defined threshold for instance), and/or in response to a defined event. The activation engine can determine, calculate, estimate and/or update the time period intermittently, periodically, or according to a schedule. The activation engine can include hardware (e.g., one or more processors, circuitry, etc.) or a combination of hardware and software. For instance, the activation engine can include a program, script, firmware or application executing on hardware. The activation engine can incorporate any embodiment of one or more components described in connection with FIGS. 1A and 1B.

The at least one variable condition (or factors) applicable to the vehicle can include at least one of: a speed of the vehicle and/or a potential obstacle (e.g., absolute or relative speed or velocity), a rate of change of the speed, a proximity/position/location of the potential obstacle (e.g., relative to the vehicle or ADAS sensor), a trajectory of the vehicle and/or the potential obstacle (e.g., absolute or relative trajectory), or a probability of the ADAS system/mechanism in detecting the potential obstacle. The at least one variable condition applicable to the vehicle can include a driving condition, such as visibility or light conditions of the vehicle's surrounding(s) for the driver.

For example, the activation engine can dynamically reduce the time period as speed of the vehicle or the potential obstacle increases. The activation engine can dynamically increase the time period as speed of the vehicle or the potential obstacle decreases. As another example, and in some embodiments, the activation engine can dynamically reduce the time period as the potential obstacle's distance from the vehicle decreases. The activation engine can dynamically increase the time period as the potential obstacle's distance from the vehicle increases. In certain embodiments, the activation engine can dynamically increase the time period as probability of the ADAS mechanism/system detecting the potential obstacle decreases. The activation engine can dynamically decrease the time period as probability of the ADAS mechanism/system detecting the potential obstacle increases. Certain variable condition(s) may offset the effect of certain other variable condition(s) in affecting or determining the time period. The activation engine may dynamically determine or update the time period according to one or a combination of variable conditions occurring or valid at a particular time and/or during a certain duration.

The activation engine can determine or update the time period, in order to establish a time period or duration for establishing or maintaining a temporal map of information that can be used to determine proximity between the driver's gaze and the potential obstacle's position. (e.g., as discussed in aforementioned embodiments). The activation engine can determine or update the time period, in order to establish a time period or duration for monitoring, tracking, maintaining, storing, accessing, filtering, checking and/or processing information of the temporal map. The temporal map may comprise information (e.g., timestamped or temporally-marked information) held, maintained or stored in any type or form of memory about at least one of: position(s) or location(s) of the potential obstacle, gaze angle(s) of the driver or user, gaze direction(s) of the driver or user, or proximity value(s) of corresponding pair(s) of the gaze angle(s), and/or the position(s) corresponding to time instances within the dynamically updated time period.

Referring again to (305), and in some embodiments, a first sensor (e.g., of an ADAS mechanism/system of the vehicle) can determine a first position of a potential obstacle to the vehicle, relative to the first sensor at a first time instance during the dynamically updated time period. The first position may correspond to a location, displacement, direction and/or distance of the potential obstacle, e.g., relative to the vehicle or the first sensor. The first sensor can include any feature of a camera, a depth sensor and/or a range/distance sensing device. The first sensor can measure, record, report, track, monitor and/or store position information of the one or more objects (or potential obstacles to the vehicle) at various time instances (e.g., during or corresponding to the dynamically updated/determined time period). The first sensor can store the position information to the memory, e.g., for potential later access and/or processing. The first sensor can store the position information (and corresponding timestamp(s)) to the memory, as part of the temporal map.

Referring again to (307), and in some embodiments, a second sensor (e.g., of the vehicle) can determine, during the dynamically updated time period, gaze angles of a user/driver of the vehicle. The gaze angle may comprise a gaze direction corresponding to the driver's eye(s), gaze, view and/or field of view. The second sensor may measure, track or record each gaze direction at a respective time instance (e.g., during the dynamically updated/determined time period), relative to a reference direction for instance. The second sensor can include any feature of a camera, an eye/gaze tracker, an eye orientation sensing device, and/or a direction sensing device. The second sensor can measure, record, report, track, monitor and/or provide gaze information (e.g., angle or direction information) of one or both eyes of the user/driver at various time instances (e.g., during or corresponding to the dynamically updated/determined time period). The second sensor can store the gaze information to the memory, e.g., for potential later access and/or processing. The second sensor can store the gaze information (and corresponding timestamp(s)) to the memory, as part of the temporal map. The temporal map or memory can for instance include or store information about at least one of: the determined positions of the potential obstacle, the determined gazed angles, gaze directions of the user, and/or proximity values of corresponding pairs of the gazed angles and the positions, corresponding to time instances within the dynamically updated/determined time period.

Referring again to (309), and in some embodiments, the activation engine can determine that a proximity of a first gaze angle of the gaze angles, to the first position, is within a defined range. As discussed in connection with one or more of FIGS. 2A-2E, the activation engine can determine, measure, calculate and/or estimate a proximity (e.g., angular or spatial proximity) between a gaze angle and a position of a potential obstacle. In some embodiments, the activation engine can determine a proximity of each of one or more gaze angles (corresponding to time instances within the dynamically updated/determined time period), to a first position of the object (e.g., detected by the ADAS system/ sensor at a first/current time instance). The dynamically updated/determined time period may include the first/current time instance, or may be situated relative to the first/current time instance. For example, the dynamically updated/determined time period can correspond to a select time period extending (e.g., backwards in time) from the first/current time instance.

If the activation engine detects proximity of gaze of the driver (e.g., gaze direction) and a position of the object, as defined in the aforementioned embodiments, by determining the proximity to be within a predefined range for any of the gaze directions in the select time period, then proximity of gaze direction of the driver and an ADAS detected position (of the object) can be declared to be detected at the current/first time instant (e.g., to initiate an ADAS action corresponding to the predefined range). Conversely, if proximity of gaze of the driver and an ADAS detected position, as defined in the aforementioned embodiments, is not detected for any of the gaze directions in the select time period, then proximity of gaze direction of the driver and an ADAS detected position is declared not to be detected at the current/first time instant. In this way, the fact that the driver has gazed at a potential object at a previous/different time instant (relative to the current/first time instance), that gaze can also be used to determine the outcome of the aforementioned processing at a current/first time instant. This means that multiple potential obstacles can be distributed across a scene and the driver can gaze at each of them separately over time (prior to, concurrent with, and/or after the current/first time instance).

In certain embodiments, the activation engine can determine a proximity of each of one or more gaze angles, relative to multiple positions of the object at various time instances within the dynamically updated/determined time period. For instance, the activation engine can check multiple pairs of gaze direction and corresponding ADAS detected positions (each pair corresponding to a same respective time instance) for proximity of gaze of the driver and an ADAS detected position of the object. In such embodiments, if any one of such proximity is detected (e.g., determined to be within a predefined range), then proximity of gaze direction of the driver and an ADAS detected position can be declared to be detected within the select time period. The activation engine can declare or otherwise indicate this at a time instance at the end of (or after, or during) the select time period. Conversely, if proximity of gaze of the driver and the an ADAS detected position, as defined in the aforementioned embodiments, is not detected for any pair of gaze direction and ADAS detected position in the select time period, then proximity of gaze direction of the driver and an ADAS detected position is declared not to be detected in the select time period. The activation engine can declare or otherwise indicate this at a time instance at the end of (or after) the select time period. In this way, the driver's gaze over different time instances within the select time period can be tracked and used to determine the outcome of the aforementioned proximity processing. This means that multiple potential obstacles can be distributed across a scene and the driver can gaze at each of them separately over time within the select time period, and these separate gazes can be considered for proximity processing with respect to ADAS detection.

Referring again to (312), and in some embodiments, the activation engine can, in response to the determined proximity being within the defined range, perform an ADAS action corresponding to the defined range. The defined range can be one of a plurality of defined ranges. A specific ADAS action may be assigned to each of the defined ranges. The activation engine can, in response to the determined proximity being within the defined range, declare that proximity of gaze direction of the driver and an ADAS detected position is detected within the select time period. In some embodiments, the activation engine performs the ADAS action corresponding to the defined range, by performing at least one of: controlling an operation of the ADAS mechanism for responding to the potential obstacle, or providing an alert to at least one of: the user regarding the potential obstacle, or the potential obstacle. The activation engine can identify that the determined proximity is at or within a first range/threshold of a plurality of predefined ranges/thresholds. The activation engine can accordingly determine the corresponding ADAS action to perform according to the determined proximity being at or within which of the plurality of predefined ranges/thresholds.

I claim:

1. A method comprising:
    determining, by a first sensor of a vehicle, a position of a potential obstacle to the vehicle;
    determining, by a second sensor of the vehicle, a gaze angle of a user of the vehicle;
    determining that a proximity of the gaze angle to the position of the potential obstacle is within a defined range;
    determining that the user's facial or eye expression corresponds to a shock or distress; and
    decreasing a threshold for a collision avoidance mechanism to initiate a collision avoidance.

2. The method of claim 1, further comprising controlling a change in illumination on the potential obstacle, the controlling including highlighting the potential obstacle.

3. The method of claim 1, further comprising controlling a change in illumination on the potential obstacle to get an attention of the user or a road user.

4. The method of claim 3, wherein the change in illumination comprises increasing illumination on the potential obstacle.

5. The method of claim 1, further comprising:
    determining, by the second sensor, a gaze direction of the user of the vehicle, relative to a reference direction; and
    determining that the user is potentially unaware of the potential obstacle, according to the gaze direction of the user and the determined position of the potential obstacle.

6. The method of claim 1, further comprising:
    determining, by the second sensor, a gaze direction of the user of the vehicle, relative to a reference direction; and
    determining the user's awareness of the potential obstacle, according to the gaze direction of the user and the determined position of the potential obstacle.

7. The method of claim 1, further comprising:
    determining, by the first sensor, at least one of a range, angle or orientation of the potential obstacle relative to a reference.

8. The method of claim 7, wherein the reference comprises at least one of: a position or orientation of the user's eye, a position or orientation of the first sensor, or a direction of the user's gaze.

9. The method of claim 1, further comprising:
    providing an outline of the potential obstacle to the user.

10. The method of claim 1, further comprising:
    adjusting the threshold for the collision avoidance mechanism to initiate the collision avoidance; and
    changing an illumination on the potential obstacle, according to the adjusted threshold.

11. A system of a vehicle, the system comprising:
- a first sensor configured to determine a position of a potential obstacle to the vehicle;
- a second sensor configured to determine a gaze angle of a user of the vehicle; and
- at least one processor configured to determine that a proximity of the gaze angle to the position of the potential obstacle is within a defined range, determine that the user's facial or eye expression corresponds to a shock or distress, and decrease a threshold for a collision avoidance mechanism to initiate a collision avoidance.

12. The system of claim 11, wherein the at least one processor is further configured to control a change in illumination on the potential obstacle, the controlling including highlighting the potential obstacle.

13. The system of claim 11, wherein the at least one processor is further configured to control a change in illumination on the potential obstacle to get an attention of the user or a road user.

14. The system of claim 11, wherein:
- the second sensor is further configured to determine a gaze direction of the user of the vehicle, relative to a reference direction; and
- the at least one processor is further configured to determine that the user is potentially unaware of the potential obstacle, according to the gaze direction of the user and the determined position of the potential obstacle.

15. The system of claim 11, wherein:
- the second sensor is further configured to determine a gaze direction of the user of the vehicle, relative to a reference direction; and
- the at least one processor is further configured to determine the user's awareness of the potential obstacle, according to the gaze direction of the user and the determined position of the potential obstacle.

16. The system of claim 11, wherein the first sensor is further configured to determine at least one of a range, angle or orientation of the potential obstacle relative to a reference.

17. The system of claim 16, wherein the reference comprises at least one of: a position or orientation of the user's eye, a position or orientation of the first sensor, or a direction of the user's gaze.

18. The system of claim 11, wherein the at least one processor is further configured to provide an outline of the potential obstacle to the user.

19. The system of claim 11, wherein the at least one processor is further configured to:
- adjust the threshold for the collision avoidance mechanism to initiate the collision avoidance; and
- change an illumination on the potential obstacle, according to the adjusted threshold.

20. A method comprising:
- determining, by a first sensor of a vehicle, a position of a potential obstacle to the vehicle;
- determining, by a second sensor of the vehicle, a gaze angle of a user of the vehicle;
- determining that a proximity of the gaze angle to the position of the potential obstacle is within a defined range;
- decreasing a threshold for a collision avoidance mechanism to initiate a collision avoidance; and
- calibrating the second sensor for determining the gaze angle of the user according to a movement of the user relative to the second sensor.

* * * * *